United States Patent Office 2,713,978
Patented July 26, 1955

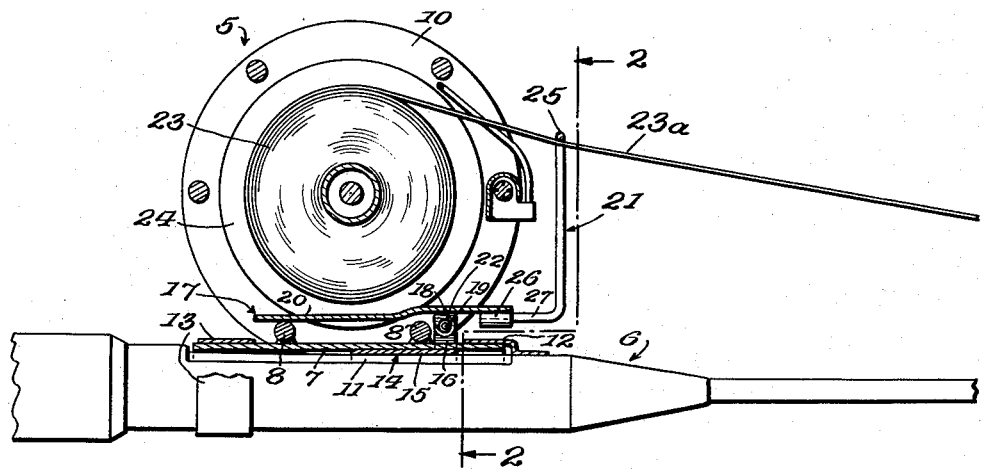

2,713,978
LINE SLACK ELIMINATOR FOR REELS
Daniel J. Daniel, Fort Smith, Ark.

Application May 22, 1953, Serial No. 356,839

5 Claims. (Cl. 242—84.5)

This invention relates to a new and improved attachment for automatically decelerating a fishing line reel as the line decelerates during casting, thus performing the equivalent of "thumbing" the reel and therefore overcoming danger of backlash and snarling of the line.

A device of the general type above mentioned is disclosed in my U. S. Patent 2,487,316 of November 8, 1949, and while that device is very effective, it is practically an impossibility to accurately and solidly mount it to all standard reels without providing special attaching brackets or adapters. Such adapters not only complicate sales, but if the fisherman possesses several reels of different makes, he must frequently purchase corresponding adapters and must therefore experience more or less inconvenience in removing and re-applying the attachment whenever he changes reels.

In endeavoring to overcome the above shortcomings, it occurred to me that all standard reels have a standard reel-supporting-and-attaching-foot to engage a more or less standard reel seat on any of numerous kinds of fishing rods, and it became apparent that if a supporting bracket for the attachment could be made to engage the reel-supporting-and-attaching-foot of one standard reel, said bracket would require no special adaptation to engage the corresponding feet of other standard reels. The attainment of this end thus became an important object of the present invention.

A further object was to provide an attaching bracket which would not interfere with engagement of the reel-supporting-and-attaching-foot with the customary means for securing this foot against the reel seat of the rod.

In attaining this latter end, a still further object of the invention was to provide an attaching bracket which would be tightly secured in place by the aforementioned means for securing the reel-supporting-and-attaching-foot against the reel seat of the rod, without requiring any additional fastening means.

As the attainment of the above objects would require a general reconstruction of the attachment, a further object became to embody the new construction in such form as to be extremely simple and inexpensive, easily and quickly attachable and detachable, and highly effective.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 is a vertical sectional view, partly in elevation, showing a reel and the present device attached to a rod;

Fig. 2 is a transverse sectional view on line 2—2 of Fig. 1, showing a front elevation of the reel and the attachment; and Fig. 3 is a disassembled perspective view of the attachment.

A preferred construction has been shown in the drawing and will be rather specifically described, but attention is invited to the possibility of making variations without departing from the spirit and scope of the invention as claimed.

The attachment is shown in operative relation with a conventional reel 5 and rod 6. The reel 5 includes the usual elongated, transversely arched supporting-and-attaching-foot 7 which is customarily secured to two of the tie rods 8 which connect the end members 9 and 10 of the reel cage. The rod 6 is provided with the usual reel seat 11, rearwardly open socket 12 at the front end of said seat 11, and slip ring 13 at the rear end of said seat. The foot 7 rests on the seat 11, the front end of said foot is received in the socket 12, and the ring 13 engages the rear end of said foot 7 as usual.

The present attachment includes a supporting bracket 14. This bracket preferably comprises a thin plate 15 and a pair of ears 16 rising from the front end of said plate 15. This plate 15 is transversely arched to fit between the reel-supporting-and-attaching-foot 7 and the reel seat 11, and the ears 16 are disposed at the longitudinal edges of said plate 15 to straddle said foot 7 and abut the foremost of the tie rods 8. The plate 15 and ears 16 may well be a single sheet metal stamping.

A brake lever 17 is provided, between its ends, with downwardly projecting ears 18 which are pivoted to the ears 16 by means of a pivot pin 19. This brake lever 17 has a brake portion 20 behind the pivot pin 19 and an arched yoke 21 in advance of said pivot pin 19. Associated with this pivot pin 19 and the ears 16—18 there is a coiled torsion spring 22. When the device is in operative position, the brake portion 20 underlies the wound line 23 on the reel 24 and overlies the tie rods 8, and the yoke 21 extends upwardly in advance of the reel. The portion 23ª of the line extending from the reel to the line guides of the rod, extends under the crown bar 25 of the yoke 21.

When casting, as long as the line portion 23ª is under more than a predetermined degree of tension, it holds the lever 17 in the position of Fig. 1 in which said lever rests on the rearmost of the tie rods 8, free of contact with the wound line 23. In this position of the lever 17, the spring 22 exerts a constant force tending to swing said lever upwardly against the wound line 23 but said spring is prevented from acting as long as the tension on the line is sufficient to cause the latter to fully support the yoke 21. As the cast lure and line decelerate and the tension on the line diminishes below the aforesaid predetermined degree, the lever 17 is gradually freed from the holding influence of the cooperating line and yoke, with the result that the spring 22 swings said lever 17 into contact with the wound line 23 to apply a braking force to the reel. Thus braking force gradually increases as the line tension decreases and the reel is thus gradually decelerated as the line and cast line decelerate. Thus, the device mechanically duplicates the well known "thumbing" of the line function which requires expert skill, no overrunning of the reel occurs and the line cannot back-lash and snarl.

The lever 17 preferably comprises a sheet metal stamping and a bent wire. The stamping has the ears 18 and two cylindrical eyes 26. The bent wire forms the arched yoke 21 and has rearward extensions 27 secured in the eyes 26. The stamping is preferably T-shaped with the eyes 26 on the ends of the T-head and the ears 18 at the juncture of this head with the shank of the T.

From the foregoing it will be seen that a novel and advantageous construction has been disclosed for attaining the desired ends, and while there is herein shown and described the preferred embodiment of the invention, it is nevertheless to be understood that minor changes may be made therein without departing from the spirit and scope of the invention as claimed.

I claim:

1. In combination, a fishing rod having a reel seat, a reel having a supporting foot engaged with said seat, means detachably securing said foot to said rod, a thin plate inserted between said foot and said seat and having upstanding ears straddling said foot, a brake lever pivoted to said ears to engage the wound line on the reel, said brake lever having a line-engaging yoke to hold said brake lever against operation when there is more than a predetermined degree of tension on the line during casting, and spring means for operating said brake lever with gradually increasing force as the line tension gradually decreases below said predetermined degree.

2. A fishing reel brake attachment comprising a thin plate to lie between the customary transversely arched reel supporting foot and the coacting reel seat of a rod, said thin plate being also transversely arched and having upstanding pivot ears to straddle the reel foot, a brake lever pivoted to said ears to engage the wound line on the reel, said brake lever having a line-engaging yoke to hold said brake lever against operation when there is more than a predetermined degree of tension on the line during casting, and spring means for operating said brake lever with gradually increasing force as the line tension gradually decreases below said predetermined degree.

3. A structure as specified in claim 2; said lever including a sheet metal stamping having cylindrical eyes at its front end, said yoke being formed from a length of wire having rearwardly extending ends secured in said eyes.

4. A structure as specified in claim 2; said lever including a sheet metal stamping having cylindrical eyes at its front end, said yoke being formed from a length of wire having rearwardly extending ends secured in said eyes, said stamping also having downwardly projecting pivot ears pivoted to said upstanding pivot ears of said thin plate.

5. A structure as specified in claim 2; said lever including a sheet metal stamping having cylindrical eyes at its front end, said yoke being formed from a length of wire having rearwardly extending ends secured in said eyes, said stamping also having downwardly projecting pivot ears pivoted to said upstanding pivot ears of said thin plate, said stamping being T-shaped, said eyes being located at the ends of the T head, said downwardly projecting pivot ears being located at the juncture of said head with the shank of the T.

References Cited in the file of this patent

UNITED STATES PATENTS

| | | |
|---|---|---|
| 835,557 | Ross | Nov. 13, 1906 |
| 1,154,220 | Toepfer | Sept. 21, 1915 |
| 1,240,677 | Cook | Sept. 18, 1917 |
| 2,303,645 | Lacy | Dec. 1, 1942 |
| 2,482,192 | MacDonald | Sept. 20, 1949 |